United States Patent
Ejiri (10) Patent No.: US 8,195,862 B2
(45) Date of Patent: Jun. 5, 2012

(54) STORAGE DEVICE HAVING A PLURALITY OF INTERFACES FOR CONNECTION TO AN EXTERNAL DEVICE

(75) Inventor: Taichi Ejiri, Nagoya (JP)

(73) Assignee: Buffalo Inc., Nagoya (JP)

( * ) Notice: Subject to any disclaimer, the term of this patent is extended or adjusted under 35 U.S.C. 154(b) by 428 days.

(21) Appl. No.: 12/545,312

(22) Filed: Aug. 21, 2009

(65) Prior Publication Data
US 2010/0057975 A1    Mar. 4, 2010

(30) Foreign Application Priority Data
Aug. 27, 2008    (JP) .................................. 2008-218255

(51) Int. Cl.
*G06F 13/00*    (2006.01)
(52) U.S. Cl. ..................... 710/313; 710/316; 711/115
(58) Field of Classification Search .............. 711/115; 710/313, 315, 316
See application file for complete search history.

(56) References Cited

U.S. PATENT DOCUMENTS

| | | | |
|---|---|---|---|
| 7,970,978 B2 * | 6/2011 | Luo et al. | 710/313 |
| 2006/0161716 A1 * | 7/2006 | Lin | 710/313 |
| 2008/0065830 A1 | 3/2008 | Aoki et al. | |
| 2009/0313434 A1 * | 12/2009 | Poo et al. | 711/115 |

FOREIGN PATENT DOCUMENTS

| | | |
|---|---|---|
| CN | 1993702 A | 7/2007 |
| JP | 2004-21993 | 1/2004 |

OTHER PUBLICATIONS

Office Action dated Mar. 23, 2011 from Chinese Application No. 200910172411.

* cited by examiner

*Primary Examiner* — Glenn A Auve
(74) *Attorney, Agent, or Firm* — Beyer Law Group LLP (57) ABSTRACT

A storage device includes a plurality of interfaces for connection to an external device, a storage unit that stores data, an effective interface setting unit, and a switching instruction receiving unit. The effective interface setting unit sets one of the plurality of interfaces as an effective interface that may access the storage unit. The switching instruction receiving unit receives an effective interface switching instruction during operation of the storage device. The effective interface setting unit switches the interface set as the effective interface based on the effective interface switching instruction.

6 Claims, 8 Drawing Sheets

STORAGE DEVICE HAVING A PLURALITY OF INTERFACES FOR CONNECTION TO AN EXTERNAL DEVICE

CROSS REFERENCE TO RELATED APPLICATIONS

The present application claims the priority based on a Japanese Patent Application No. 2008-218255 filed on Aug. 27, 2008, the disclosure of which is hereby incorporated by reference in its entirety.

BACKGROUND

1. Technical Field

The present invention relates to a storage device, and relates in particular to a storage device equipped with multiple interfaces for connection to an external device.

2. Description of Related Art

Hard disk drives, which are storage devices designed to store data, enjoy widespread use as one type of peripheral for personal computers. There are various different interfaces for connecting a computer and a hard disk drive. Such interfaces include, for example, the IEEE 1394 interface, the USB interface, and the LAN interface.

Hard disk drives that are equipped with multiple interfaces for connection to computers are known in the art. When a hard disk drive of this kind has been physically connected to a computer via the multiple interfaces, the hard disk drive will be operated by the computer through one interface ranked highest in a predetermined order of precedence, or through one interface representing the connection that was set up first, for example.

With the conventional hard disk drive mentioned above, it is not possible to switch the interface being used or to modify the order of precedence of the interfaces while the hard disk drive is connected to a computer and in use. Specifically, when it is desired to switch the interface or modify the order of precedence, it is necessary to first release the connection between the hard disk drive and the computer, for example, by unplugging the connecting cable or by rebooting. Accordingly, with conventional hard disk drives having multiple interfaces, there is room for improvement in terms of user convenience.

This problem is not limited to hard disk drives; rather, it is a problem common generally to storage devices having multiple interfaces.

SUMMARY

An object of the present invention is to provide a storage device with multiple interfaces, that would afford improved user convenience.

The present invention is addressed to attaining the above objects at least in part according to the following aspects of the invention.

Aspect 1.

A storage device comprising:

a plurality of interfaces for connection to an external device;

a storage unit that stores data;

an effective interface setting unit that sets one of the plurality of interfaces as an effective interface that may access the storage unit; and a switching instruction receiving unit that receives an effective interface switching instruction during operation of the storage device, wherein the effective interface setting unit switches the interface set as the effective interface based on the effective interface switching instruction.

According to the storage device of the aspect 1, one of the plurality of interfaces is set as the effective interface that may access the storage unit, and the interface set as the effective interface is switched on the basis of the effective interface switching instruction when the instruction is received during operation of the storage device, thereby affording improved user convenience in a storage device having multiple interfaces.

Aspect 2.

The storage device in accordance with aspect 1, wherein one of the plurality of interfaces is a network interface for connection to a network, the storage device further comprises a file sharing unit that provides a device on the network with a service for sharing a data file stored in the storage unit, and prior to switching the interface set as the effective interface from the network interface to another interface, the effective interface setting unit has the file sharing unit stop providing the service for sharing a data file.

According to the storage device of the aspect 2, prior to switching the interface set as the effective interface from the network interface to another interface, the service for sharing a data file is stopped, thereby preventing device misoperation or corruption/loss of data resulting from the effective interface being switched while data is being transferred via the data file sharing service, and further improving operational stability and data reliability of the storage device.

Aspect 3.

The storage device in accordance with aspect 1, wherein the effective interface setting unit opens a data transfer path between the storage unit and one of the plurality of interfaces that is to be set as the effective interface, and closes a data transfer path between the storage unit and the other interfaces.

According to the storage device of the aspect 3, one of the plurality of interfaces can be set as the effective interface enabling access to the storage unit, and the interface set as the effective interface can subsequently be switched based on the effective interface switching instruction.

Aspect 4.

The storage device in accordance with aspect 1, wherein the plurality of interfaces are interfaces of mutually different type.

According to the storage device of the aspect 4, user convenience can be improved in a storage device having multiple interfaces of mutually different type.

Aspect 5.

The storage device in accordance with aspect 4, wherein the plurality of interfaces include a USB interface and a LAN interface.

According to the storage device of the aspect 5, user convenience can be improved in a storage device having multiple interfaces including a USB interface and a LAN interface.

The present invention can be realized in various aspects. For example, the present invention can be realized in aspects such as a storage device; an interface switching method and device for a storage device; a computer program for accomplishing the functions of such a method or device; a recording medium having such a computer program recorded thereon; a data signal including such a computer program and carried on a carrier wave; and the like.

These and other objects, features, aspects, and advantages of the present invention will become more apparent from the following detailed description of the preferred embodiments with the accompanying drawings.

DESCRIPTION OF THE PREFERRED EMBODIMENT

The embodiments of the present invention are described below in the indicated order:
A. Embodiment 1
 A-1: Device Configuration
 A-2: Switching Process
B. Embodiment 2
C. Embodiment 3
D. Embodiment 4
E. Modified Embodiments

A. Embodiment 1

A-1: Device Configuration

Figure 1:
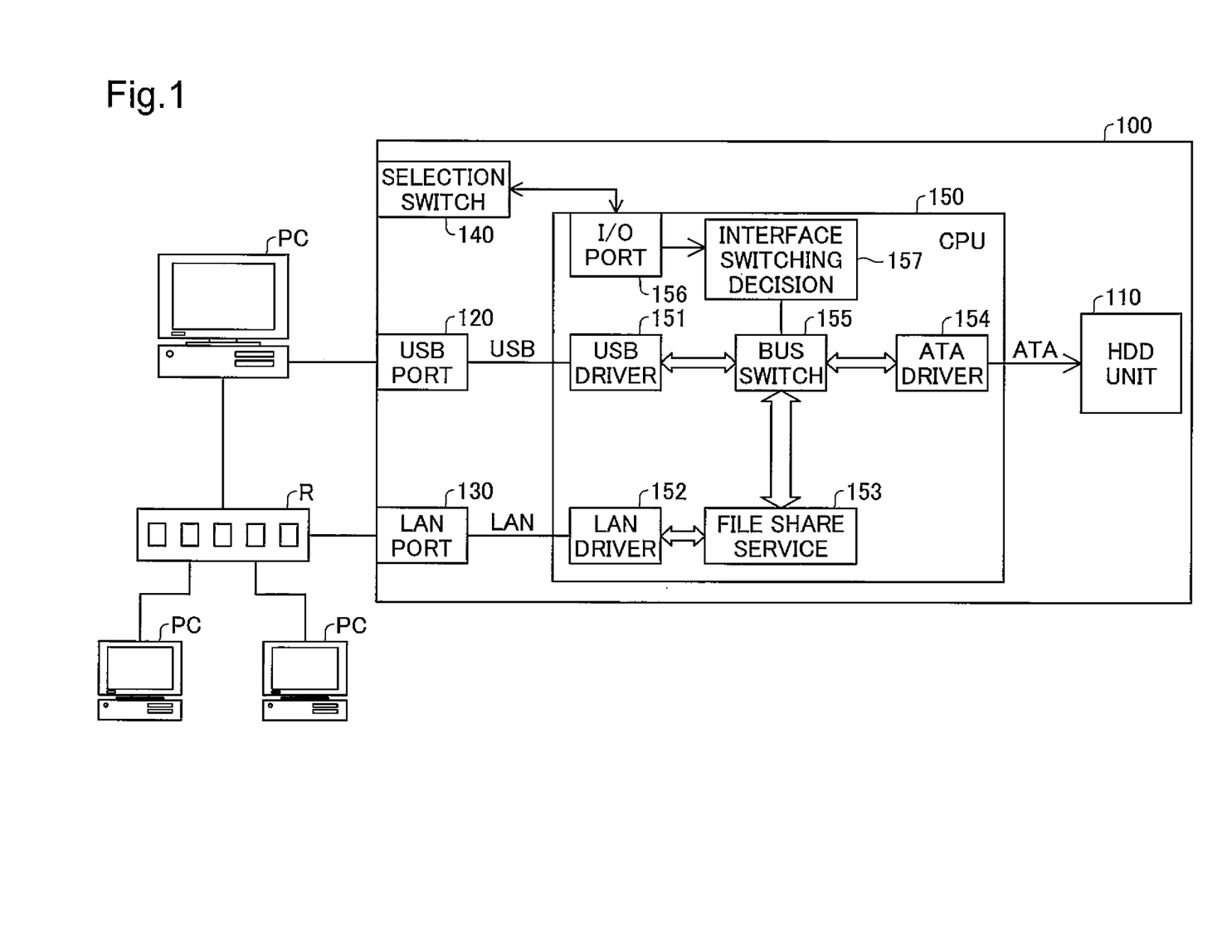
FIG. 1 is a diagram depicting a configuration of a hard disk drive 100 according to Embodiment 1 of the present invention.

FIG. 1 is a diagram depicting a configuration of a hard disk drive 100 according to Embodiment 1 of the present invention. The hard disk drive 100 of the present embodiment is a peripheral device that connects to a computer PC, and constitutes a storage device that is used to store data. The hard disk drive 100 has multiple interfaces. Specifically, the hard disk drive 100 can be connected to the computer PC through two interfaces, a USB interface and a LAN interface.

As shown in FIG. 1, the hard disk drive 100 has a hard disk drive unit (HDD unit) 110 that includes one or more hard disks for storing data; a USB port 120 for a USB connection to the computer PC; a LAN port 130 for a LAN connection to the computer PC; a selection switch 140 that allows the user to perform a switching operation of the effective interface, discussed later; and a CPU 150 for overall control of the hard disk drive 100.

The CPU 150 includes a USB driver 151 for controlling data transfer in accordance with USB protocols; a LAN driver 152 for controlling data transfer in accordance with LAN protocols; a file share service module 153 for providing data file share services to computers PC on the network; an ATA driver 154 for controlling data transfer in accordance with ATA protocols; a bus switch 155 for switching the path of data transfer; an I/O port 156; and an interface switching decision module 157 for making decisions in relation to switching of the effective interface, discussed later. The functions of the elements included in the CPU 150 may be accomplished by having the CPU 150 load and execute computer programs that correspond to these elements, from an internal memory (not shown).

In the event that the hard disk drive 100 has been connected to the computer PC through the USB interface, the hard disk drive 100 will operate as a USB device of the computer PC to which the hard disk drive 100 has been directly connected. In this instance, data transfer between the computer PC and the HDD unit 110 will take place over a transfer path (herein also termed the "USB transfer path") that leads from the computer PC to the USB port 120, the USB driver 151, the bus switch 155, the ATA driver 154, and the HDD unit 110. On this path, data transfer between the USB port 120 and the USB driver 151 will take place in accordance with USB protocols, while data transfer between the ATA driver 154 and the HDD unit 110 will take place in accordance with ATA protocols, with protocol conversion between USB and ATA being carried out in the CPU 150.

On the other hand, in the event that the hard disk drive 100 is connected to the computer PC through the LAN interface, the hard disk drive 100 will operate as an NAS (Network Attached Storage) shared by computers PC on the network. In this instance, exchange of data between the computer PC and the HDD unit 110 will take place over a transfer path (herein also termed the "LAN transfer path") that leads from the computer PC to a router R, the LAN port 130, the LAN driver 152, the file share service module 153, the bus switch 155, the ATA driver 154, and the HDD unit 110. On this path, data transfer between the LAN port 130 and the LAN driver 152 will take place in accordance with LAN protocols, while data transfer between the ATA driver 154 and the HDD unit 110 will take place in accordance with ATA protocols, with protocol conversion between LAN and ATA being carried out in the CPU 150. Also, in this instance, the data file share service 153 will provide the computers PC on the network with a sharing service of data files stored in the HDD unit 110.

The selection switch 140 is a physical switch adapted to switch between two states corresponding to the two interfaces (the USB interface and the LAN interface). A signal that indicates the current state (i.e. a state corresponding one of the interfaces) of the selection switch 140 (this signal is also referred to herein as "switch state signal") is input to the CPU 150 via the I/O port 156. Depending on the input switch state signal, the interface switching decision module 157 will then make a decision in relation to switching the effective interface, discussed later.

Under the control of the interface switching decision module 157, the bus switch 155 will toggle the switch to open up either the USB path or the LAN path discussed above, while closing the other. The interface corresponding to the transfer path that has been opened up by the bus switch 155 will then be established as the interface that may access the HDD unit 110 (hereinafter termed the "effective interface").

The HDD unit 110 is equivalent to storage unit in the present invention; the selection switch 140 and the I/O port 156 are equivalent to the switching instruction receiving unit in the present invention; the interface switching decision module 157 and the bus switch 155 are equivalent to the effective interface setting unit in the present invention; and the file share service module 153 is equivalent to file sharing unit in the present invention.

A-2: Switching Process

Figure 2:
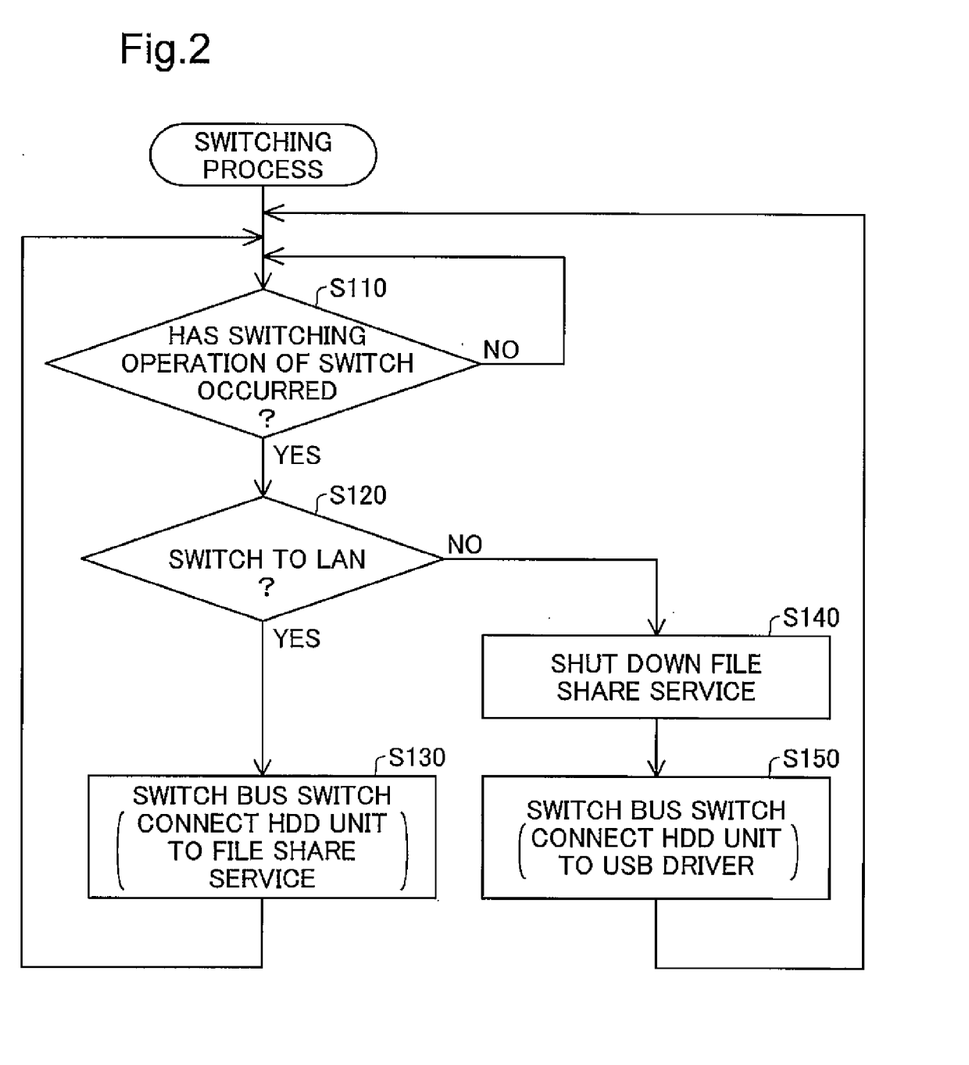
FIG. 2 is a flowchart depicting the flow of the switching process in the hard disk drive 100 according to Embodiment 1.

FIG. 2 is a flowchart depicting the flow of the switching process in the hard disk drive 100 according to Embodiment 1. The switching process is a process that takes place during operation of the hard disk drive 100, to switch the effective interface in response to a switching instruction. Switching of the effective interface refers to a process of changing the effective interface from the interface that is currently set as the effective interface to another interface that is identified by the switching instruction.

During startup of the hard disk drive 100, the interface that corresponds to the state of the selection switch 140 will be set up as the effective interface. The switching process will be initiated when startup of the hard disk drive 100 is complete, and will continue to be executed continuously during operation of the hard disk drive 100.

Of these effective interface switching choices, switching from the USB interface to the LAN interface could be carried out, for example, in the event that during use of the hard disk drive 100 as a USB device by the computer PC to which the hard disk drive 100 has been connected via the USB port, the user now wishes to share the HDD unit 110 with another computer PC on the network. On the other hand, switching from the LAN interface to the USB interface could be carried out, for example, in the event that the user wishes to achieve higher data transfer speed through a USB connection, while the computer PC to which the hard disk drive 100 is connected to by the LAN port 130 is using the hard disk drive 100 as an NAS.

In Step S110 (FIG. 2), the CPU 150 will determine whether there has been a switching operation of the selection switch 140 (i.e. whether there has been an effective interface switching instruction). Specifically, through polling via the I/O port 156, the CPU 150 will monitor the switching state signal that represents the current state (corresponding to a particular interface) of the selection switch 140, and if it determines that the switching state signal has changed, will determine that a switching operation of the selection switch 140 has taken place.

In Step S120, on the basis of the input switching state signal, the interface switching decision module 157 of the CPU 150 will determine whether the switching operation of the selection switch 140 is a switching operation to the LAN interface or a switching operation to the USB interface. Specifically, if the switching state signal is a signal that corresponds to the LAN interface, the interface switching decision module 157 will determine that the switching operation is an operation for switching from the USB interface to the LAN interface; or if the switching state signal is a signal that corresponds to the USB interface, it will determine that the switching operation is an operation for switching from the LAN interface to the USB interface.

If in Step S120 the interface switching decision module 157 has determined that the switching operation is to the LAN interface, it will open up the LAN transfer path by switching the bus switch 155 (Step S130). The HDD unit 110 will thereby be connected to the file share service module 153 and to the LAN driver 152; and sharing service of data files stored in the HDD unit 110 will be provided to the computers PC on the network.

On the other hand, if in Step S120 the interface switching decision module 157 has determined that the switching operation is to the USB interface, it will shut down the file share service currently being provided by the file share service module 153 (Step S140). Thus, the sharing service of data files that have been stored in the HDD unit 110 which was being provided to the computers PC on the network will terminate. Subsequently, the interface switching decision module 157 will open up the USB transfer path by switching the bus path 155 (Step S150). The HDD unit 110 will thereby be connected to the USB driver 151, and data storage service will be provided to the computer PC to which the hard disk drive 100 has been connected via the USB port 120.

Subsequent to Steps 130 and S150 of FIG. 2, the process will return to Step S110 (state monitoring of the selection switch 140 by the CPU 150), and the above process will be executed again.

As discussed above, at any time during operation of the hard disk drive 100, the hard disk drive 100 of Embodiment 1 is capable of switching of the effective interface without the need to disconnect the connection cable between the computer PC and the hard disk drive 100 or to restart the hard disk drive 100. Thus, the hard disk drive 100 of Embodiment 1 affords improved user convenience in a storage device equipped with multiple interfaces.

Moreover, in the switching process that takes place in the hard disk drive 100 of Embodiment 1, when switching from the LAN interface to the USB interface, the file share service provided by the file share service module 153 will be shut down (Step S140 of FIG. 2) prior to switching by the bus switch 155 (Step S150 of FIG. 2), thereby proactively preventing device misoperation or corruption/loss of data resulting from the LAN transfer path being cut during data transfer between a computer PC and the HDD unit 110 via the file share service module 153, and further improving operational stability and data reliability of the hard disk drive 100.

B. Embodiment 2

Figure 3:
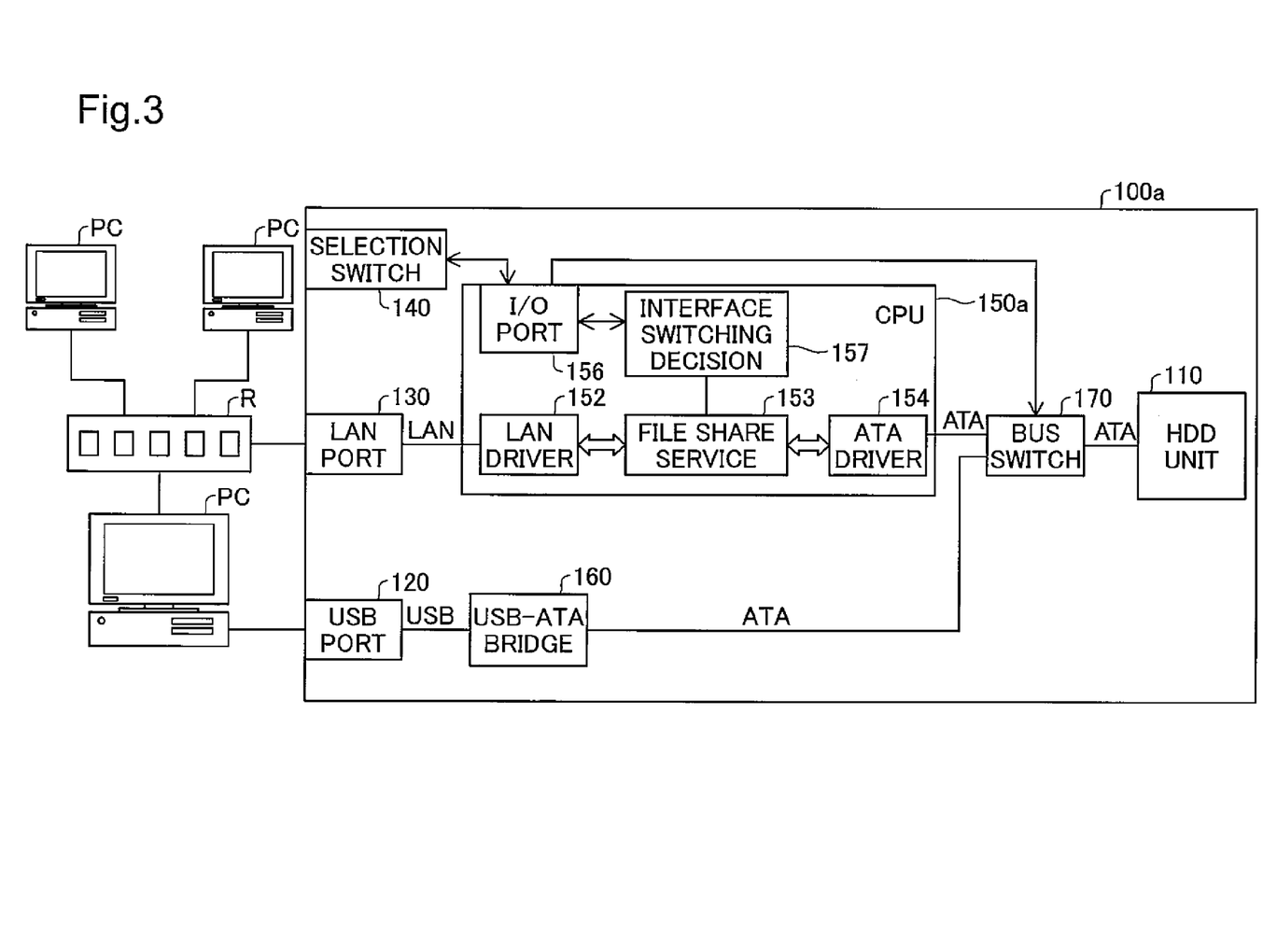
FIG. 3 is a diagram depicting a configuration of a hard disk drive 100a according to Embodiment 2 of the present invention.

FIG. 3 is a diagram depicting a configuration of a hard disk drive 100a according to Embodiment 2 of the present invention. The hard disk drive 100a of Embodiment 2 differs from the hard disk drive 100 of Embodiment 1 (see FIG. 1) in that it also has a USB-ATA bridge 160 (a circuit for protocol conversion between USB and ATA) and a bus switch 170 adapted to switch the effective interface, these being provided as separate constitutional elements from the CPU 150a. That is, while the CPU 150a provided to the hard disk drive 100a of Embodiment 2 has a LAN driver 152, a file share service module 153, an ATA driver 154, an I/O port 156, and an interface switching decision module 157, it lacks a USB driver 151 and a bus switch 155. The configuration of the hard disk drive 100a is otherwise comparable to Embodiment 1.

In Embodiment 2, where the hard disk drive 100a has been connected to a computer PC via a USB interface and is being operated as a USB device of the computer PC to which the hard disk drive 100a has been directly connected, data transfer between the computer PC and the HDD unit 110 will take place over a path (hereinafter also termed the "USB transfer path") leading from the computer PC to the USB port 120, the USB-ATA bridge 160, the bus switch 170, and then to the HDD unit 110. On this transfer path, data transfer between the USB port 120 and the USB-ATA bridge 160 will take place by USB protocols, while data transfer from the USB-ATA bridge 160 to the HDD unit 110 will take place by ATA protocols, with protocol conversion between USB and ATA taking place in the USB-ATA bridge 160.

On the other hand, where the hard disk drive 100a has been connected to a computer PC via a LAN interface and is being operated as an NAS that is shared by computers PC on the network, exchange of data between computers PC and the HDD unit 110 will take place over a path (hereinafter also termed the "LAN transfer path") leading from the computer PC to a router R, the LAN port 130, the LAN driver 152, the file service sharing module 153, the ATA driver 154, the bus switch 170, and thence to the HDD unit 110. On this transfer path, data transfer between the LAN port 130 and the LAN driver 152 will take place by LAN protocols, while data transfer between the ATA driver 154 and the HDD unit 110 will take place by ATA protocols, with protocol conversion between LAN and ATA being performed in the CPU 150*a*.

Under the control of the interface switching decision module 157, the bus switch 170 will toggle the switch in order to open up either the aforementioned USB transfer path or LAN transfer path, while closing the other. The interface corresponding to the transfer path that has been opened through switching of the bus switch 170 will be set as the effective interface that may access the HDD unit 110.

In Embodiment 2, the interface switching decision module 157 and the bus switch 170 are equivalent to the effective interface setting unit in the present invention.

Figure 4:
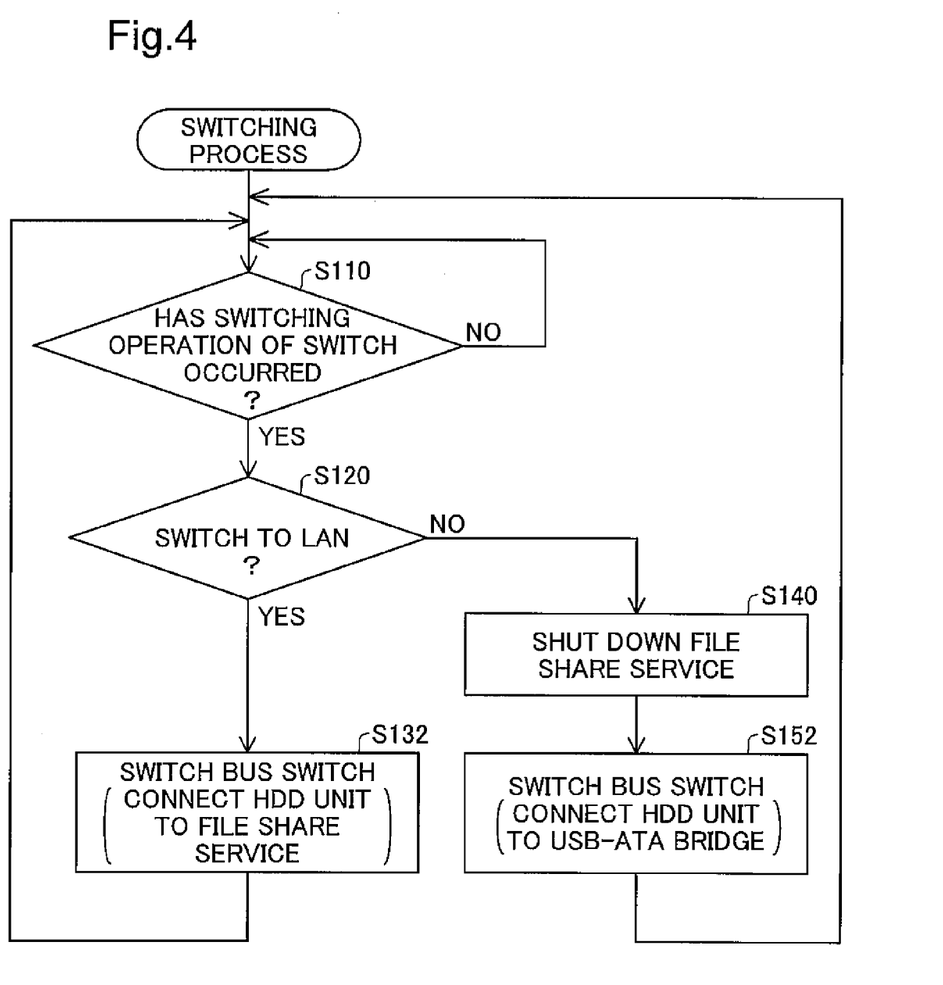
FIG. 4 is a flowchart depicting the flow of the switching process in the hard disk drive 100a of Embodiment 2.

FIG. 4 is a flowchart depicting the flow of the switching process in the hard disk drive 100*a* of Embodiment 2. In the switching process of Embodiment 2, the particulars of Steps S110 and S120 are the same as in Embodiment 1 (see FIG. 2).

If in Step S120 it has been determined that the switching operation is to the LAN interface, the interface switching decision module 157 (FIG. 3) will open up the LAN transfer path by switching the bus path switch 170 (Step S132). The HDD unit 110 will thereby be connected to the file share service module 153 and to the LAN driver 152; and sharing service of data files stored in the HDD unit 110 will be provided to the computers PC on the network.

On the other hand, if in Step S120 it has been determined that the switching operation is to the USB interface, the interface switching decision module 157 will shut down the file share service currently being provided by the file share service module 153 (Step S140), and open up the USB transfer path by switching the bus switch 170 (Step S152). Thus, the HDD unit 110 will be connected to the USB-ATA bridge 160, and data storage service will be provided via the USB port 120 to the computer PC to which the hard disk drive 100*a* has been connected.

As discussed above, as in Embodiment 1, at any time during operation of the hard disk drive 100*a* of Embodiment 2, the hard disk drive 100*a* will be able to switch the effective interface without the need to disconnect the connection cable between the computer PC and the hard disk drive 100*a* or to restart the hard disk drive 100*a*, so improved user convenience can be attained in a storage device equipped with multiple interfaces. Moreover, when switching from the LAN interface to the USB interface, the file share service provided by the file share service module 153 will be shut down (Step S140 of FIG. 4) prior to switching by the bus switch 170 (Step S152 of FIG. 4), thereby proactively preventing device misoperation or corruption/loss of data resulting from the LAN transfer path being cut during data transfer between a computer PC and the HDD unit 110 via the file share service module 153, and further improving operational stability and data reliability of the hard disk drive 100*a*. Additionally, because the hard disk drive 100*a* of Embodiment 2 employs a dedicated circuit, namely, the USB-ATA bridge 160, for protocol conversion between USB and ATA, faster data transfer speeds can be achieved during use as a USB device.

C. Embodiment 3

Figure 5:
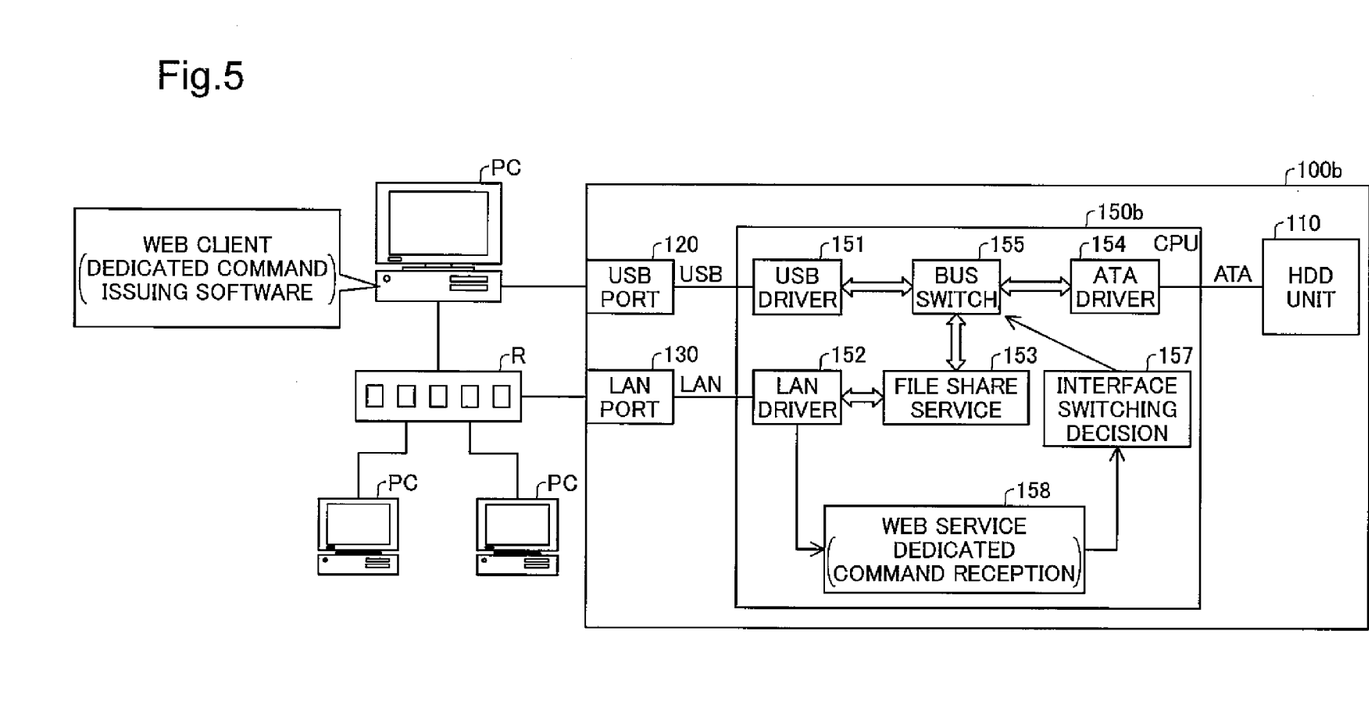
FIG. 5 is a diagram depicting a configuration of a hard disk drive 100b according to Embodiment 3 of the present invention.

FIG. 5 is a diagram depicting a configuration of a hard disk drive 100*b* according to Embodiment 3 of the present invention. The hard disk drive 100*b* of Embodiment 3 differs from the hard disk drive 100 of Embodiment 1 shown in FIG. 1 in terms of its arrangement for receiving effective interface switching instructions. Specifically, the hard disk drive 100*b* of Embodiment 3 lacks the physical switch represented by the selection switch 140 (see FIG. 1), and instead has a Web service module 158 whereby the CPU 15 receives switching instructions. The configuration of the hard disk drive 100*b* is otherwise similar to Embodiment 1.

The Web service module 158 uses the Web to deliver various services to Web clients which have been provided on the computers PC. These services include, for example, an initial setting service for carrying out initial settings of the hard disk drive 100*b*, as well as an effective interface switching service. Specifically, when the Web client provided on a computer PC issues a command instructing switching of the effective interface, the Web service module 158 will receive the command via the network, and will prompt the interface switching decision module 157 to switch the effective interface. In Embodiment 3, the Web service module 158 is equivalent to switching instruction receiving unit in the present invention.

The elements that make up the USB transfer path and the LAN transfer path in the hard disk drive 100*b* of Embodiment 3, as well as the protocols used for data transfer, are the same as in Embodiment 1 (see FIG. 1).

Figure 6:
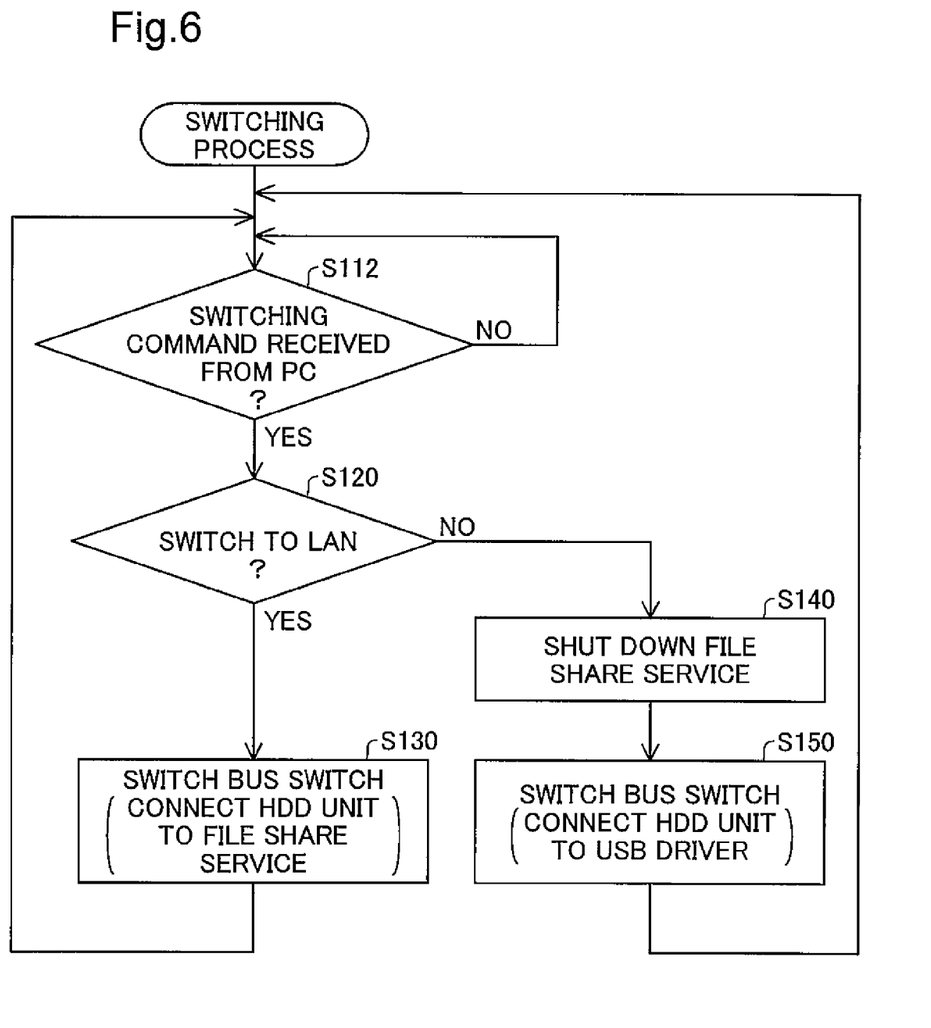
FIG. 6 is a flowchart depicting the flow of the switching process in the hard disk drive 100b of Embodiment 3.

FIG. 6 is a flowchart depicting the flow of the switching process in the hard disk drive 100*b* of Embodiment 3. In Step S112, the CPU 150*b* will determine whether an effective interface switching command has been received from the computer PC. Specifically, the CPU 150*b* will wait for the Web service module 158 to receive a command issued by the Web client of the computer PC and instructing that the effective interface be switched. Upon receiving the command, the process will advance to Step S120. The processing particulars of the subsequent steps (Steps S120 to S150 of FIG. 6) are the same as in Embodiment 1 depicted in FIG. 2.

As discussed above, as in Embodiment 1, in the switching process in the hard disk drive 100*b* of Embodiment 3, switching of the effective interface can be accomplished at any time during operation of the hard disk drive 100*b*, without the need to disconnect the connection cable between the computer PC and the hard disk drive 100*b* or to restart the hard disk drive 100*b*, so improved user convenience can be attained in a storage device equipped with multiple interfaces. Moreover, when switching from the LAN interface to the USB interface, the file share service provided by the file share service module 153 will be shut down (Step S140 of FIG. 6) prior to switching by the bus switch 155 (Step S150 of FIG. 6), thereby proactively preventing device misoperation or corruption/loss of data resulting from the LAN transfer path being cut during data transfer between a computer PC and the HDD unit 110 via the file share service module 153, and further improving operational stability and data reliability of the hard disk drive 100*b*.

In the event that the switching command issued by the computer PC is a switching command from the USB interface to the LAN interface, a process to verify that the connection to the hard disk drive 100*b* being used as a USB device has been released may be carried out in the computer PC prior to switching by the bus switch 155 (Step S130 of FIG. 6). Specifically, the hard disk drive 100*b* may wait to receive from the Web client of the computer PC a command indicating that release of the connection is complete; and after having received the command, proceed to execute the process of Step S130. In this case, the Web client may bring up on the display of the computer PC a message prompting the user to release the connection to the hard disk drive 100*b* being used as a USB device. By so doing, the connection between the computer PC and the hard disk drive 100*b* being used as a USB device will be released prior to switching by the bus switch 155 (Step S130), thus proactively preventing device misoperation or corruption/loss of data resulting from the USB transfer path being cut during data transfer between the computer PC and the HDD unit 110 via the USB interface, and further improving operational stability and data reliability of the hard disk drive 100b.

It is not essential that effective interface switching instructions to the hard disk drive 100b from a computer PC be made via the Web. Specifically, as depicted in FIG. 5, in another acceptable arrangement the computer PC could be provided with a dedicated command issuing software designed to issue commands for controlling the hard disk drive 100b; and effective interface switching instructions could be made through receipt by the CPU 150b of the hard disk drive 100b of dedicated commands issued from the computer PC.

D. Embodiment 4

Figure 7:
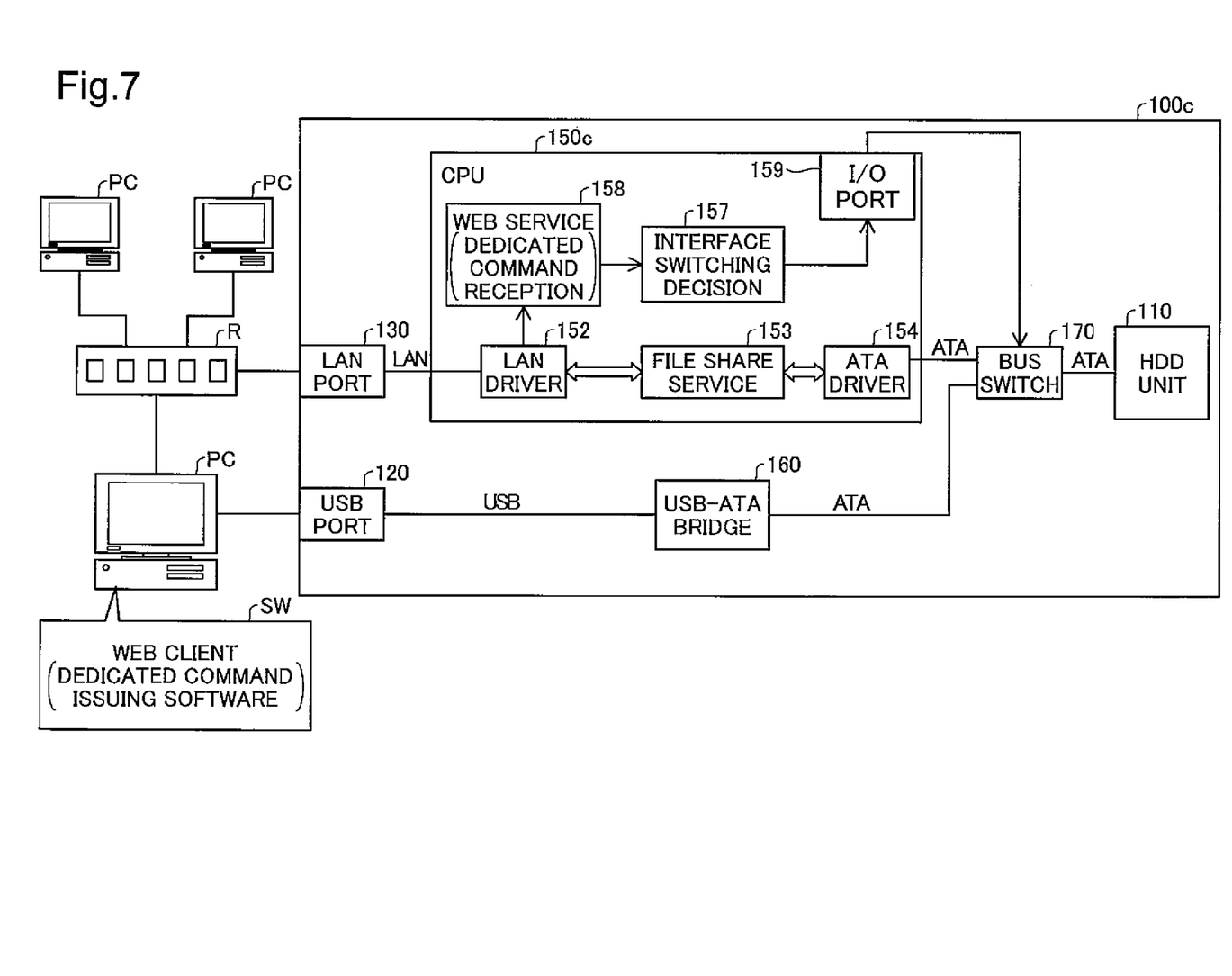
FIG. 7 is a diagram depicting a configuration of a hard disk drive 100c according to Embodiment 4 of the present invention.

FIG. 7 is a diagram depicting a configuration of a hard disk drive 100c according to Embodiment 4 of the present invention. The hard disk drive 100c of Embodiment 4 differs from the hard disk drive 100b of Embodiment 3 (see FIG. 5) in that it is furnished with a USB-ATA bridge 160 (a circuit for protocol conversion between USB and ATA), and a bus switch 170 adapted to switch the effective interface, these being provided as separate constitutional elements from the CPU 150c. That is, while the CPU 150c provided to the hard disk drive 100c of Embodiment 4 has a LAN driver 152, a file share service module 153, an ATA driver 154, an interface switching decision module 157, a Web service module 158, and an I/O port 159, it lacks a USB driver 151 and a bus switch 155. The configuration of the hard disk drive 100c is otherwise comparable to Embodiment 3.

The elements that make up the USB transfer path and the LAN transfer path in the hard disk drive 100c of Embodiment 4, as well as the protocols used for data transfer, are the same as in Embodiment 2 (see FIG. 3). In Embodiment 4, the interface switching decision module 157 and the bus switch 170 are equivalent to the effective interface setting unit in the present invention; and the Web service module 158 is equivalent to switching command receiving unit in the present invention.

Figure 8:
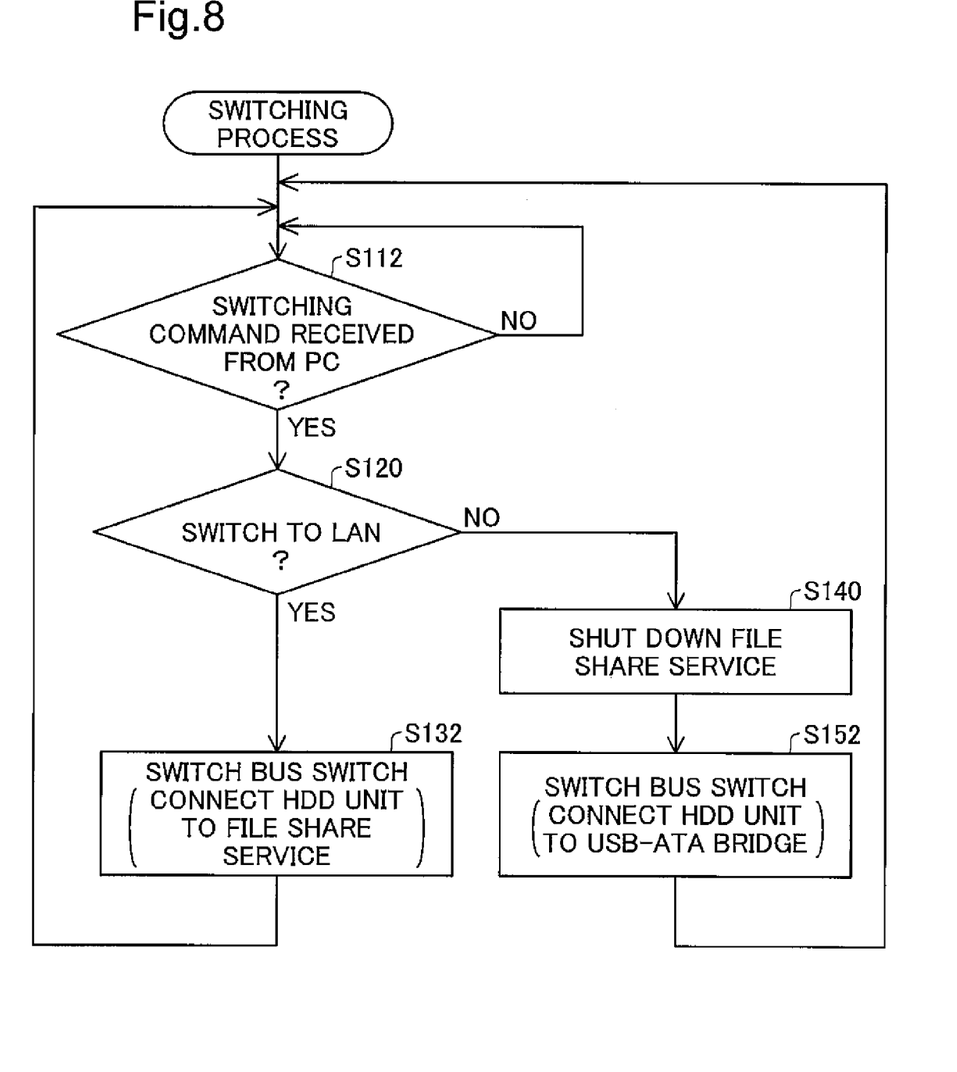
FIG. 8 is a flowchart depicting the flow of the switching process in the hard disk drive 100c of Embodiment 4.

FIG. 8 is a flowchart depicting the flow of the switching process in the hard disk drive 100c of Embodiment 4. In the switching process of Embodiment 4, the particulars of Step S112 are the same as in Embodiment 3 shown in FIG. 6. The particulars of Step S120 and subsequent steps (Steps S120 to S152 of FIG. 8) are the same as in Embodiment 2 shown in FIG. 4.

As discussed above, as in Embodiment 1, at any time during operation of the hard disk drive 100c of Embodiment 4, the hard disk drive 100c is capable of switching the effective interface without the need to disconnect the connection cable between the computer PC and the hard disk drive 100c or to restart the hard disk drive 100c, so improved user convenience can be attained in a storage device equipped with multiple interfaces. Moreover, when switching from the LAN interface to the USB interface, the file share service provided by the file share service module 153 will be shut down (Step S140 of FIG. 8) prior to switching by the bus switch 170 (Step S152 of FIG. 8), thereby proactively preventing device misoperation or corruption/loss of data resulting from the LAN transfer path being cut during data transfer between a computer PC and the HDD unit 110 via the file share service module 153, and further improving operational stability and data reliability of the hard disk drive 100c. Additionally, because the hard disk drive 100c of Embodiment 4 employs a dedicated circuit, namely, the USB-ATA bridge 160, for protocol conversion between USB and ATA, faster data transfer speeds can be achieved during use as a USB device.

As in Embodiment 3, in Embodiment 4, in the event that the switching command issued by the computer PC is a switching command from the USB interface to the LAN interface, a process to verify that the connection to the hard disk drive 100c being used as a USB device has been released may be carried out in the computer PC prior to switching by the bus switch 170 (Step S132 of FIG. 8). Also, as in Embodiment 3, in Embodiment 4 it is not essential that effective interface switching instructions to the hard disk drive 100c from a computer PC be made via the Web; as depicted in FIG. 7, in another acceptable arrangement the computer PC could be provided with a dedicated command issuing software designed to issue commands for controlling the hard disk drive 100c; and effective interface switching instructions could be made through receipt by the CPU 150c of the hard disk drive 100c of dedicated commands issued from the computer PC.

E. Modified Embodiments

While the present invention has been shown above through certain preferred embodiments, the invention is in no way limited to these embodiments, and without departing from the spirit of the invention may be reduced to practice in various other modes, such as the following modifications for example.

E1. Modified Embodiment 1

The hard disk drive 100 configurations described in the preceding embodiments are merely exemplary, and various possible modifications may be made thereto. For example, whereas in the preceding embodiments the hard disk drive 100 is furnished with two interfaces, the hard disk drive 100 may instead be provided with three or more interfaces. In this instance as well, the interface to be set as the new effective interface from among the three or more interfaces will be identified through an effective interface switching instruction (a switch state signal or command as described in the preceding embodiments).

The interfaces provided to the hard disk drive 100 are not limited to a USB interface and a LAN interface, and other interfaces (e.g. an IEEE 1394 interface or wireless LAN interface) may be provided as well. The hard disk drive 100 may also be provided with multiple interfaces of the same type.

In the preceding embodiments, the hard disk drive 100 has a file share service module 153, but it is not essential for the hard disk drive 100 to have a file share service module 153.

Some of the arrangements implemented through hardware in the preceding embodiments may instead be implemented through software, and conversely some of the arrangements implemented through software may instead be implemented through hardware. For example, in Embodiment 2 (see FIG. 3), protocol conversion between USB and ATA is carried out through hardware, namely, the USB-ATA bridge 160, but protocol conversion between LAN and ATA may be carried out analogously through hardware.

The present invention is not intended to be limited to a hard disk drive 100 furnished with an HDD unit 110, and is applicable generally to storage devices having a storage unit for storing data.

E2. Modified Embodiment 2

In the preceding embodiments, switching operations by the selection switch 140 were monitored through polling by the CPU 150; however, switching operations by the selection switch 140 may be accompanied by a signal indicating that a switching operation has occurred being sent from the selection switch 140 to the CPU 150.

What is claimed is:

1. A storage device comprising:
a plurality of interfaces for connection to an external device;
a storage unit that stores data;
an effective interface setting unit that sets one of the plurality of interfaces as an effective interface that may access the storage unit; and
a switching instruction receiving unit that receives an effective interface switching instruction during operation of the storage device,
wherein the effective interface setting unit switches the interface set as the effective interface based on the effective interface switching instruction,
wherein one of the plurality of interfaces is a network interface for connection to a network, the storage device further comprises a file sharing unit that provides a device on the network with a service for sharing a data file stored in the storage unit, and prior to switching the interface set as the effective interface from the network interface to another interface, the effective interface setting unit has the file sharing unit stop providing the service for sharing a data file.

2. The storage device in accordance with claim 1, wherein the effective interface setting unit opens a data transfer path between the storage unit and one of the plurality of interfaces that is to be set as the effective interface, and closes a data transfer path between the storage unit and the other interfaces.

3. The storage device in accordance with claim 2, wherein the plurality of interfaces are interfaces of mutually different type.

4. The storage device in accordance with claim 3, wherein the plurality of interfaces include a USB interface and a LAN interface.

5. The storage device in accordance with claim 1, wherein the plurality of interfaces are interfaces of mutually different type.

6. The storage device in accordance with claim 5, wherein the plurality of interfaces include a USB interface and a LAN interface.

* * * * *